(12) United States Patent
Hamid

(10) Patent No.: US 9,087,197 B2
(45) Date of Patent: Jul. 21, 2015

(54) DEVICE AND METHOD FOR VERIFYING CONNECTIVITY

(75) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 187 days.

(21) Appl. No.: 13/508,665

(22) PCT Filed: Nov. 15, 2010

(86) PCT No.: PCT/CA2010/001810
§ 371 (c)(1),
(2), (4) Date: May 31, 2012

(87) PCT Pub. No.: WO2011/057409
PCT Pub. Date: May 19, 2011

(65) Prior Publication Data
US 2012/0233358 A1    Sep. 13, 2012

Related U.S. Application Data

(60) Provisional application No. 61/260,875, filed on Nov. 13, 2009.

(51) Int. Cl.
*G06F 3/00* (2006.01)
*G06F 21/57* (2013.01)

(52) U.S. Cl.
CPC ..................................... *G06F 21/57* (2013.01)

(58) Field of Classification Search
CPC . G06F 2221/2141; G06F 21/31; G06F 21/57; H04L 9/3247; H04L 9/3271; H04L 9/3234
USPC ........................................................ 710/15
See application file for complete search history.

(56) References Cited

U.S. PATENT DOCUMENTS

| 6,249,868 B1 | 6/2001 | Sherman et al. |
| 6,321,335 B1 | 11/2001 | Chu |
| 6,370,649 B1 | 4/2002 | Angelo et al. |
| 6,718,463 B1 | 4/2004 | Malik |
| 6,754,817 B2 | 6/2004 | Khatri et al. |
| 7,069,433 B1 | 6/2006 | Henry et al. |

(Continued)

FOREIGN PATENT DOCUMENTS

| EP | 1 168 235 A2 | 1/2002 |
| GB | 2 420 198 A | 5/2006 |

(Continued)

OTHER PUBLICATIONS

Kevin. "Review: IronKey Secure USB Flash Drive," Oct. 3, 2007, p. 1-5. Retrieved from the Internet: <URL: http://www.geek.com/articles/gadgets/review-ironkey-secure-usb-flash-drive-2007103/> , retrieved on Nov. 15, 2012.

(Continued)

*Primary Examiner* — Chun-Kuan Lee
(74) *Attorney, Agent, or Firm* — Dorsey & Whitney LLP

(57) ABSTRACT

A portable desktop device and method for host computer system hardware recognition and configuration are provided. The portable desktop device once authenticated provides access to a portable desktop application that provides a beat signal to the portable desktop device. In an absence of the beat signal, the portable desktop device prevents access to the portable desktop application and/or data associated therewith.

18 Claims, 6 Drawing Sheets

(56) References Cited

U.S. PATENT DOCUMENTS

| | | |
|---|---|---|
| 7,293,166 B2 | 11/2007 | Nguyen et al. |
| 7,363,363 B2 | 4/2008 | Dal Canto et al. |
| 7,484,089 B1 | 1/2009 | Kogen et al. |
| 7,512,512 B2 | 3/2009 | Foote et al. |
| 7,555,568 B2 | 6/2009 | Huang |
| 7,865,573 B2 | 1/2011 | Tyhurst et al. |
| 7,975,287 B2 | 7/2011 | Hung |
| 8,024,790 B2 | 9/2011 | Zhao et al. |
| 8,065,676 B1 | 11/2011 | Sahai et al. |
| 8,104,088 B2 | 1/2012 | Khilnani et al. |
| 8,140,869 B2 | 3/2012 | Song et al. |
| 8,176,153 B2 | 5/2012 | Bose |
| 2002/0087877 A1 | 7/2002 | Grawrock |
| 2002/0188565 A1 | 12/2002 | Nakamura et al. |
| 2003/0023839 A1 | 1/2003 | Burkhardt et al. |
| 2003/0101246 A1 | 5/2003 | Lahti |
| 2003/0195950 A1 | 10/2003 | Huang et al. |
| 2003/0216136 A1 | 11/2003 | McBrearty et al. |
| 2004/0019778 A1 | 1/2004 | Gere |
| 2004/0095382 A1 | 5/2004 | Fisher et al. |
| 2004/0103288 A1 | 5/2004 | Ziv et al. |
| 2005/0193188 A1 | 9/2005 | Huang |
| 2005/0235045 A1 | 10/2005 | Narayanaswami et al. |
| 2006/0080540 A1 | 4/2006 | Arnon et al. |
| 2006/0085845 A1 | 4/2006 | Davis et al. |
| 2006/0130004 A1 | 6/2006 | Hughes et al. |
| 2006/0200679 A1 | 9/2006 | Hawk et al. |
| 2007/0016743 A1 | 1/2007 | Jevans |
| 2007/0101118 A1 | 5/2007 | Raghunath et al. |
| 2007/0143837 A1 | 6/2007 | Azeez et al. |
| 2007/0300220 A1 | 12/2007 | Seliger et al. |
| 2008/0016005 A1 | 1/2008 | Owen et al. |
| 2008/0022393 A1 | 1/2008 | Waltermann et al. |
| 2008/0052528 A1 | 2/2008 | Poo et al. |
| 2008/0052770 A1 | 2/2008 | Ali et al. |
| 2008/0052776 A1 | 2/2008 | Prabhat et al. |
| 2008/0072289 A1 * | 3/2008 | Aoki et al. ............ 726/3 |
| 2008/0172555 A1 | 7/2008 | Keenan |
| 2008/0215796 A1 | 9/2008 | Lam et al. |
| 2008/0293450 A1 | 11/2008 | Ryan et al. |
| 2009/0049307 A1 * | 2/2009 | Lin .................... 713/185 |
| 2009/0132816 A1 | 5/2009 | Lee |
| 2009/0210794 A1 | 8/2009 | Pendse et al. |
| 2009/0260071 A1 | 10/2009 | Sadovsky et al. |
| 2009/0300710 A1 * | 12/2009 | Chai et al. ............ 726/1 |
| 2009/0319782 A1 | 12/2009 | Lee |
| 2010/0036973 A1 | 2/2010 | Mardiks et al. |
| 2010/0098243 A1 * | 4/2010 | Chopart ................ 380/28 |
| 2010/0251328 A1 | 9/2010 | Syed et al. |
| 2011/0078347 A1 | 3/2011 | Hamid |
| 2011/0078428 A1 | 3/2011 | Hamid |
| 2011/0078785 A1 | 3/2011 | Hamid |
| 2011/0078787 A1 | 3/2011 | Hamid |

FOREIGN PATENT DOCUMENTS

| | | |
|---|---|---|
| WO | WO 98/04967 A1 | 2/1998 |
| WO | WO2007149671 A2 | 12/2007 |
| WO | WO 2008/122755 A1 | 10/2008 |
| WO | WO 2011/038502 | 4/2011 |
| WO | WO 2011/038503 | 4/2011 |
| WO | WO 2011/038504 | 4/2011 |
| WO | WO 2011/038505 | 4/2011 |
| WO | WO 2011/057409 | 5/2011 |

OTHER PUBLICATIONS

Roudebush, Bob. "VThere—A Second Look", retrieved Jul. 31, 2006 from <http://www.roudybob.net/?p=307> 4 pages.

* cited by examiner

DEVICE AND METHOD FOR VERIFYING CONNECTIVITY

This application is a U.S. national stage application under 35 U.S.C. 371 of PCT Patent Application No. PCT/CA2010/001810, filed Nov. 15, 2010, entitled "Device and Method for Verifying Connectivity," which claims priority to U.S. Provisional Application No. 61/260,875, filed Nov. 13, 2009, the contents of both of which are hereby incorporated in their entirety by reference.

FIELD OF THE INVENTION

The invention relates to portable desktops, and more particularly to the recognition of hardware of a host of a portable desktop.

BACKGROUND OF THE INVENTION

A portable desktop allows a user to utilize the hardware of a host computer system and thus provides a portable computing environment. A portable desktop may be physically embodied in portable storage media and more often is embodied in a portable device which includes processing hardware, storage, and input/output (I/O) hardware for communication with the host system and/or authentication by a user. The portable computing environment, hereinafter referred to as the portable desktop, is portable in the sense that any changes made to data files, software, settings, user preferences, or any other configuration or aspect of that computing environment made during a session on the host computer system, which are intended to be permanent, are stored in the portable device such that the portable desktop has continuity across multiple sessions. The appearance, functionality, content and/or configuration of the portable desktop should also be independent of any changes made to any particular host computer system, as well as be independent of the particular host computer system used for any session. Portability, therefore, depends upon the ability of the portable desktop device to function with different host computer systems.

One type of portable desktop device is a USB memory device used to transport and store the portable desktop data. In a typical situation, the device is inserted into a host computer USB port from which it derives power. The host computer provides power to the device until the host computer is powered down or until the device is removed from the USB port thereof. From powering of the USB memory device, security features thereon are enabled. Once accessed, the device acts to support portable desktop functionality. Typically, this involves rebooting the host computer or powering it up from an unpowered state. Further typically, the portable desktop environment is discontinued when the host computer is powered down or when the USB memory device is removed from the USB port thereof.

A known security problem exists when a secure device is kept in a powered state once use of the device is completed. For example, if a USB hub were introduced between the host computer and USB devices coupled therewith, and the USB hub were powered, then a USB device would retain a power on state even when the hub was removed from the host computer. When this happens, it is often the case that some of the security of the USB memory device remains disabled as the device is already enabled for use; as such, the device is still accessible differently from what was intended.

It would be advantageous for there to be a method or system for supporting secure portable desktops that overcomes security and/or other limitations of known portable desktop approaches.

SUMMARY OF THE INVENTION

According to one aspect, the invention provides for a method comprising: coupling a portable desktop device comprising portable desktop data stored therein to a host computer; enabling access to the portable desktop data; executing a portable desktop application received from the portable desktop device on the host computer system; at intervals transmitting from the host computer system to the portable desktop device a beat signal indicating a presence and operability of the host computer; and, when the portable desktop device other than receives a beat signal at the interval, disabling access to the portable desktop data.

In accordance with another embodiment of the invention there is provided a portable desktop device comprising: I/O hardware for coupling the portable desktop device to a host computer system; memory storage comprising: a portable desktop storage block comprising a portable desktop O/S; and a processor for during use receiving a beat signal from the host computer at intervals and for, in the absence of receiving a beat signal at the interval preventing access to the memory storage.

In accordance with another embodiment of the invention there is provided a portable desktop device comprising: an input output port for coupling the portable desktop device to a host computer system; memory storage comprising: a portable desktop storage block comprising a portable desktop O/S; and a processor for during use providing to the host computer system at second intervals a challenge signal and for, in response thereto receiving a beat signal from the host computer at first intervals and for, in the absence of receiving the beat signal at the first interval preventing access to the memory storage.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
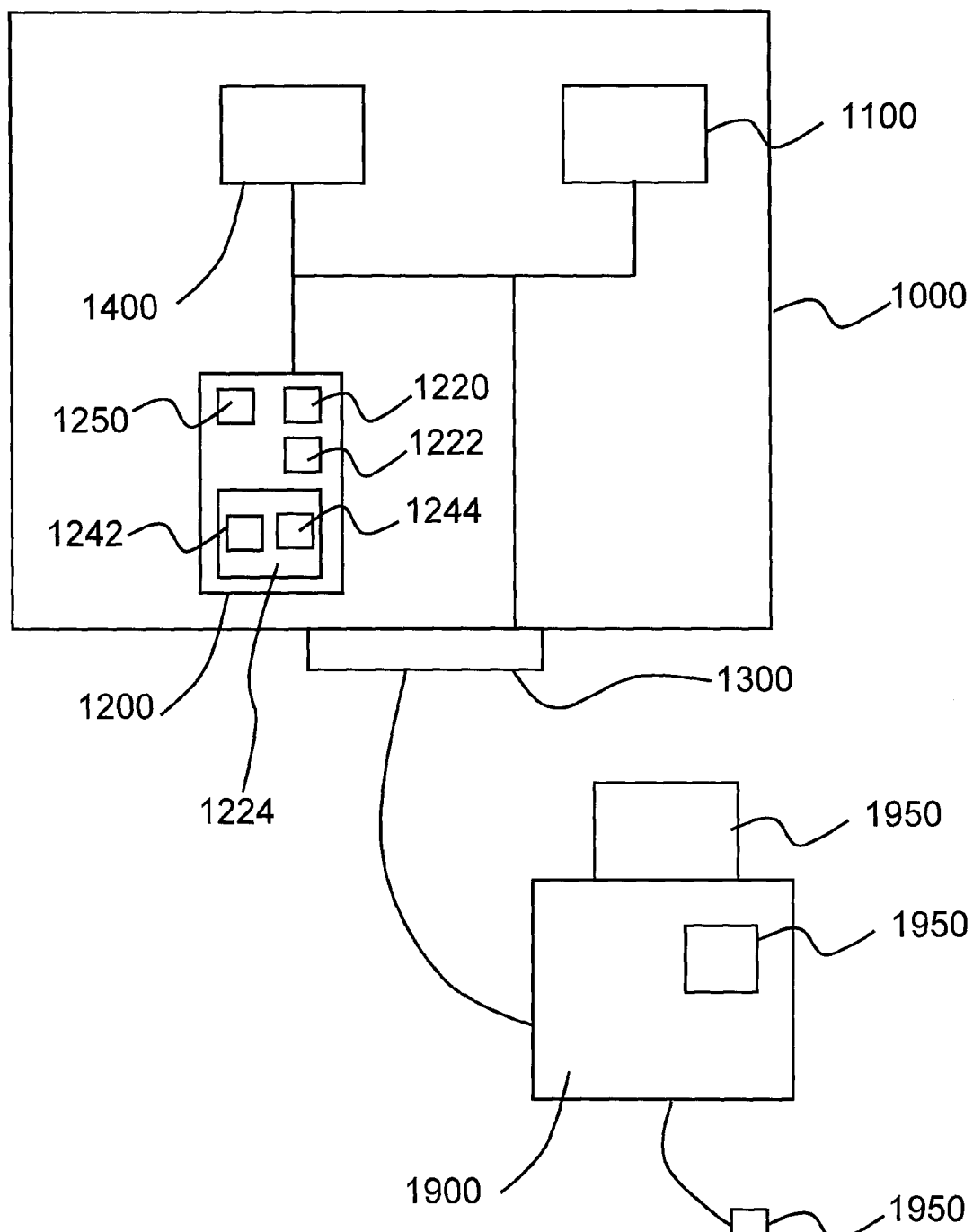
FIG. 1 is a block diagram illustrating a portable desktop device according to an embodiment of the invention and its host computer system and associated hardware devices.

Referring to FIG. 1, a portable desktop device 1000 according to an embodiment of the invention will now be discussed in terms of structure.

The portable desktop device 1000 is shown connected to its host computer system 1900. The host computer system 1900 is coupled to a number of hardware devices 1950. Some of the hardware devices 1950 are external to the host computer system 1900 while others are internal hardware devices. For the purposes of the invention, no distinction is made between an external or an internal hardware device, and as such hardware devices 1950 includes any and all hardware connected to and controlled by the host computer system 1900.

The host computer system 1900 is any computer system capable of interfacing with the portable desktop device 1000. The portable desktop device 1000 is in the form of a powered peripheral device capable of interfacing with the host computer system 1900 and in some embodiments is a universal serial bus (USB) storage and processing device.

The portable desktop device 1000 is connected to the host computer system 1900 by input/output (I/O) hardware 1300. In addition to I/O hardware 1300, the portable desktop device 1000 comprises a processor 1100, authentication hardware 1400, and memory storage 1200. The processor 1100 is coupled to the I/O hardware 1300, the authentication hardware 1400, and the memory storage 1200. The authentication hardware 1400 may comprise biometric authentication hardware such as a fingerprint, retinal, or other scanner or may comprise some other input hardware for receiving a bar code, encryption key, combination, password or other authentication information. Alternatively, the authentication hardware forms part of the host computer system 1900.

The memory storage 1200 comprises a boot process 1220 application data storage block including application storage for a security process 1222 and a portable desktop storage block 1224. The portable desktop storage block 1224 comprises a portable desktop O/S 1242. The portable desktop storage block 1224 also includes a storage block for the portable desktop user data 1244. The portable desktop O/S 1242 may include user data in the form of O/S preferences or configuration settings for a user. The portable desktop user data 1244 may include user installed applications which do not form part of the O/S along with preferences or configuration settings thereof, as well as any other data files associated with the portable desktop the user may have. In embodiments for which multiple users are supported, per user files, preferences or configuration settings are stored in the portable desktop O/S 1242 and multiple instances of portable desktop user data 1244, one for each user, are present in the portable desktop storage block 1224 (not shown). Optionally, in other embodiments, further portable desktop storage blocks are present in the memory storage 1200, each having its own portable desktop O/S and portable desktop user data block. This allows for further separation among users and/or groups of users, insuring not only that data and functions of each portable desktop environment are separated but that each user or group of users that can access one portable desktop environment have no knowledge of there being other users who use other desktop environments. A second portable desktop storage block 1250 is shown in dashed lines in FIG. 1.

Figure 2:
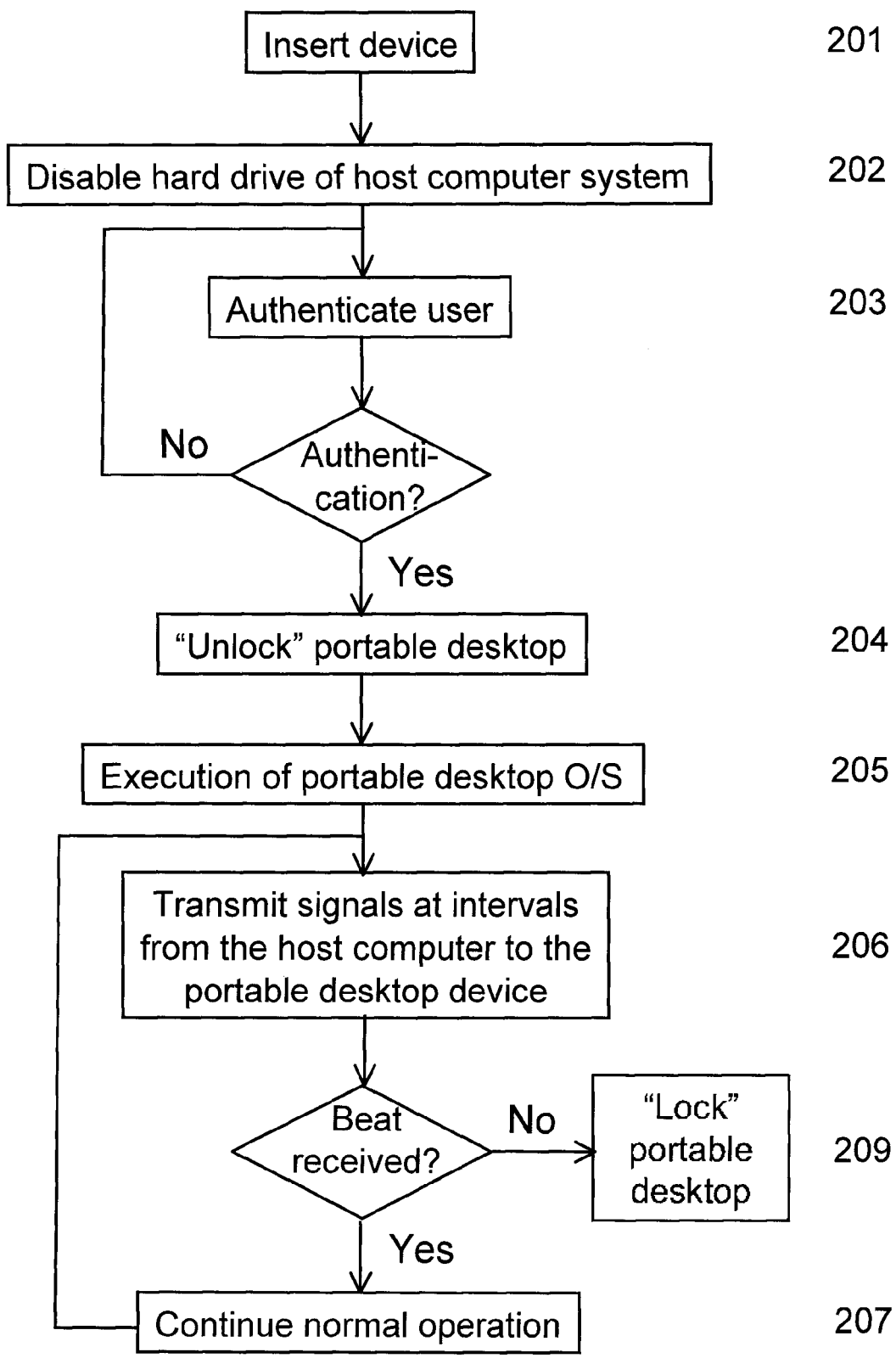
FIG. 2 is a functional block diagram illustrating a method of portable desktop host hardware recognition and configuration.

Referring also to FIG. 2, the portable desktop device 1000 of FIG. 1 will now be described in terms of its functioning. In most embodiments of the invention, in which the portable desktop device 1000 is a USB device, the device is inserted at 201 before a boot process is executed such that the portable desktop device 1000 can disable a hard drive of the host computer system 1900 at 202. Use of the portable desktop device 1000 occurs when the host computer system 1900 is turned on and goes through a boot process while the portable desktop device 1000 is connected to the host computer system 1900. Prior to this, a main board or other booting hardware of the host computer system 1900 is configured to boot from the portable desktop device 1000 or is configured to boot from internal and external devices in an order such that when the portable desktop device 1000 is connected to the host computer system 1900 at the time the host computer system 1900 is turned on, the host computer system 1900 (HCS) will boot from the portable desktop device 1000 (PDD) as it does in step 200 of FIG. 2.

In some embodiments, hot-plugging the portable desktop device 1000 will trigger the host computer system 1900 to detect the portable desktop device 1000 and prompt the user to confirm whether or not the system should be restarted in order to commence the portable desktop session.

During a boot of the host computer system 1900 from the portable desktop device 1000, the host computer system 1900 requests, through the I/O hardware 1300, a bootable process, for example the portable desktop O/S within data storage of the memory storage 1200 and executes the portable desktop O/S. Typically, the portable desktop device 1000 is initially secured. Prior to supporting a portable desktop application, the portable desktop device 1000 typically requires user authentication. For example, when the portable desktop device 1000 comprises a fingerprint platen, a fingerprint of a user is authenticated at 203 to "unlock" the portable desktop data at 204. Alternatively, another form of user authentication is performed. Further alternatively, authentication is performed using input/output devices of the host computer system 1900.

After user authentication and once the portable desktop device 1000 is "unlocked," for example during execution of the portable desktop O/S at 205, a signal is transmitted at 206 from the host computer to the portable desktop device at intervals to indicate that the host computer is still active. The signal transmitted is optionally a beat signal sent every so often to indicate activity. For example the beat signal is a periodic signal. Alternatively, the beat signal is transmitted at time intervals that vary in a fashion known to the portable desktop device 1000. Further alternatively, a content of the beat signal varies in a fashion known to the portable desktop device 1000. Alternatively, the beat signal is a response to a challenge provided from the portable desktop device to the host computer. Further optionally, the beat signal comprises a response to a challenge issued between beats or to another previously issued challenge. When the beat signal is received at the portable desktop device, the device continues normal operation at 207.

In such an embodiment, removal of the portable desktop device connection to the host computer system while maintaining power to the device is detectable as a potential security threat since the beat signal is not provided to the portable desktop device 1000 during the disruption.

When a beat signal is other than detected by the portable desktop device 1000, the portable desktop device is locked at 209 and access thereto is prevented absent a further user authentication operation.

Timing of the beat signal is preferably significantly less than the amount of time required to disconnect and reconnect the portable desktop device. For example, the timing is on the order of a few milliseconds. Further preferably, the content of the beat signal is not easily copied or determined in order to prevent another device from mimicking the beat signal once the host computer system is disconnected.

Figure 3:
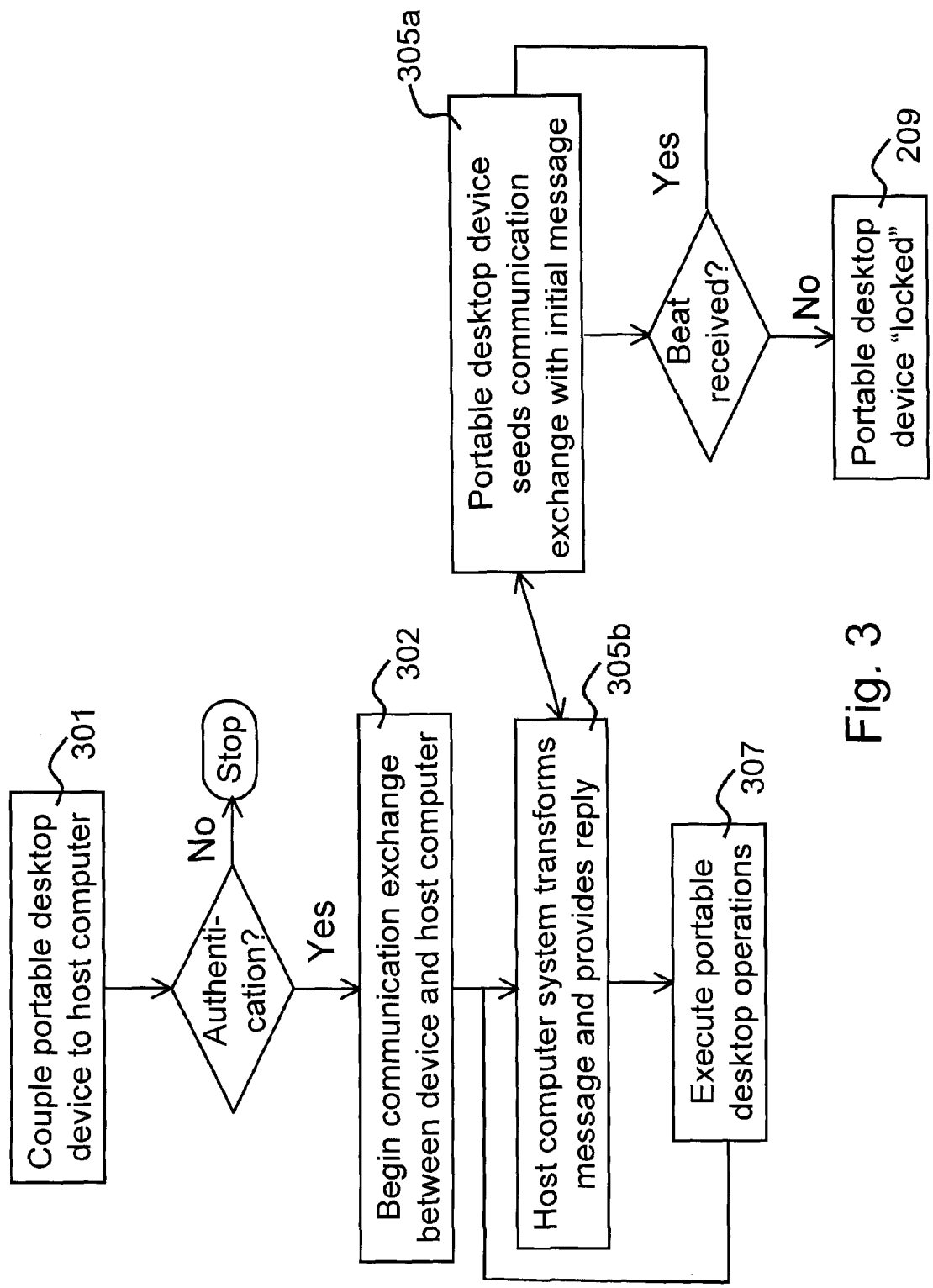
FIG. 3 is a simplified flow diagram of a method according to an embodiment of the invention.

Referring to FIG. 3, a simplified flow diagram of a method according to an embodiment of the invention is presented. Here, a portable desktop device 1000 is coupled to a host computer system 1900 at 301. Once a user has authenticated to the portable desktop device 1000 at 302, the host computer system begins a communication exchange with the device. In the communication exchange, a first device seeds the communication exchange with an initial message at 305*a*. The other device transforms the message and provides a reply at 305b. This transform and reply process continues between the two devices—the portable desktop device 1000 and the host computer system 1900. Between transform operations, the host computer system executes portable desktop operations at 307. If the communication path between devices is interrupted, the communication exchange is absent and the portable desktop device "locks" itself at 209 as described hereinabove.

Figure 4:
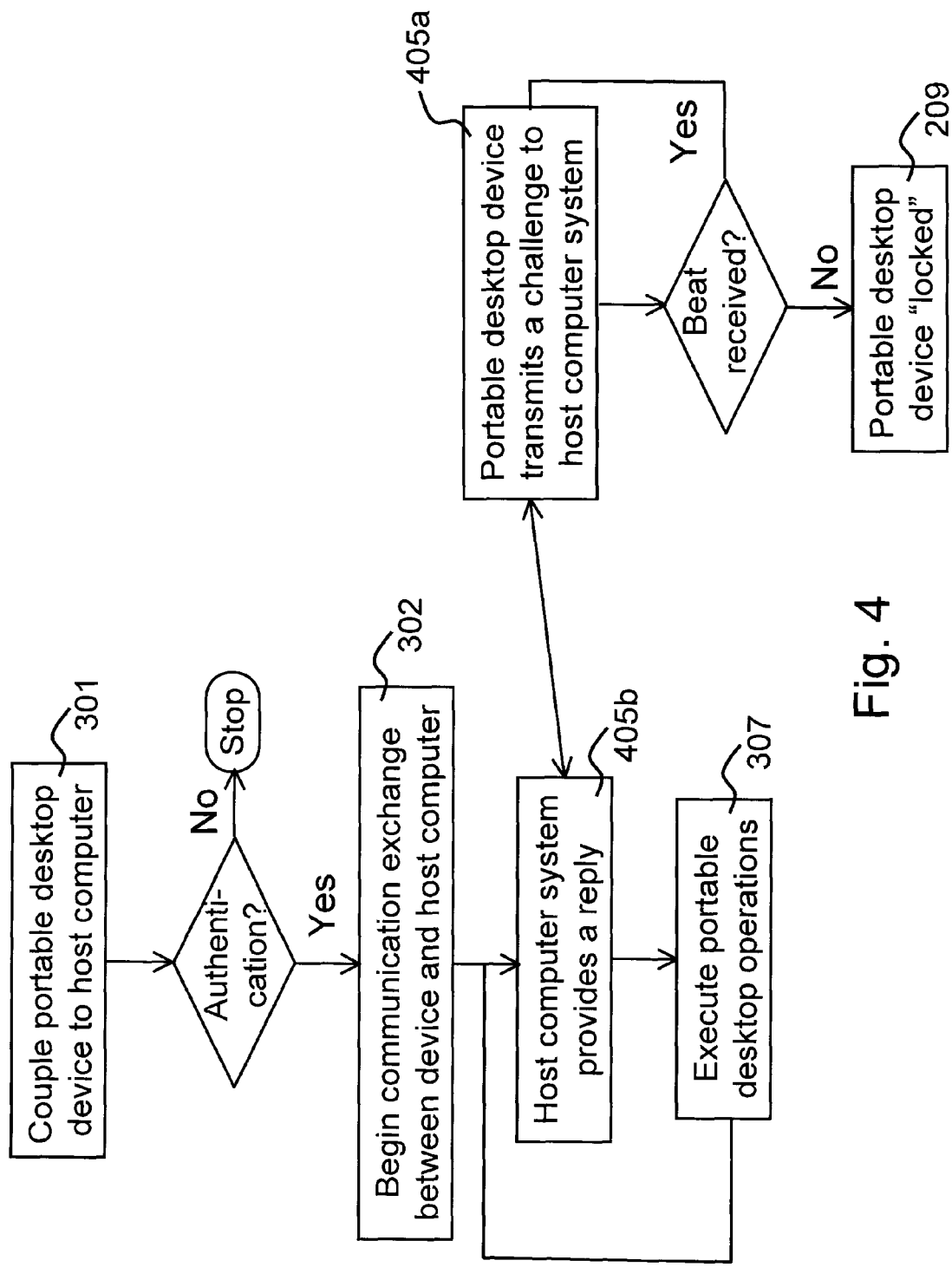
FIG. 4 is a simplified flow diagram of a method according to an embodiment of the invention.

Referring to FIG. 4, a simplified flow diagram of a method according to an embodiment of the invention is presented. Here, a portable desktop device 1000 is coupled to a host computer system 1900. Once a user has authenticated to the portable desktop device 1000, the device begins a communication exchange with the host computer system. In the communication exchange, the portable desktop device 1000 transmits a challenge to the host computer system 1900 at 405a. The host computer system 1900 provides a reply at 405b. This challenge and reply process continues between the two devices—the portable desktop device 1000 and the host computer system 1900. If the communication path between devices is interrupted, the reply is not received and the portable desktop device "locks" itself at 209 as described hereinabove.

Figure 5:
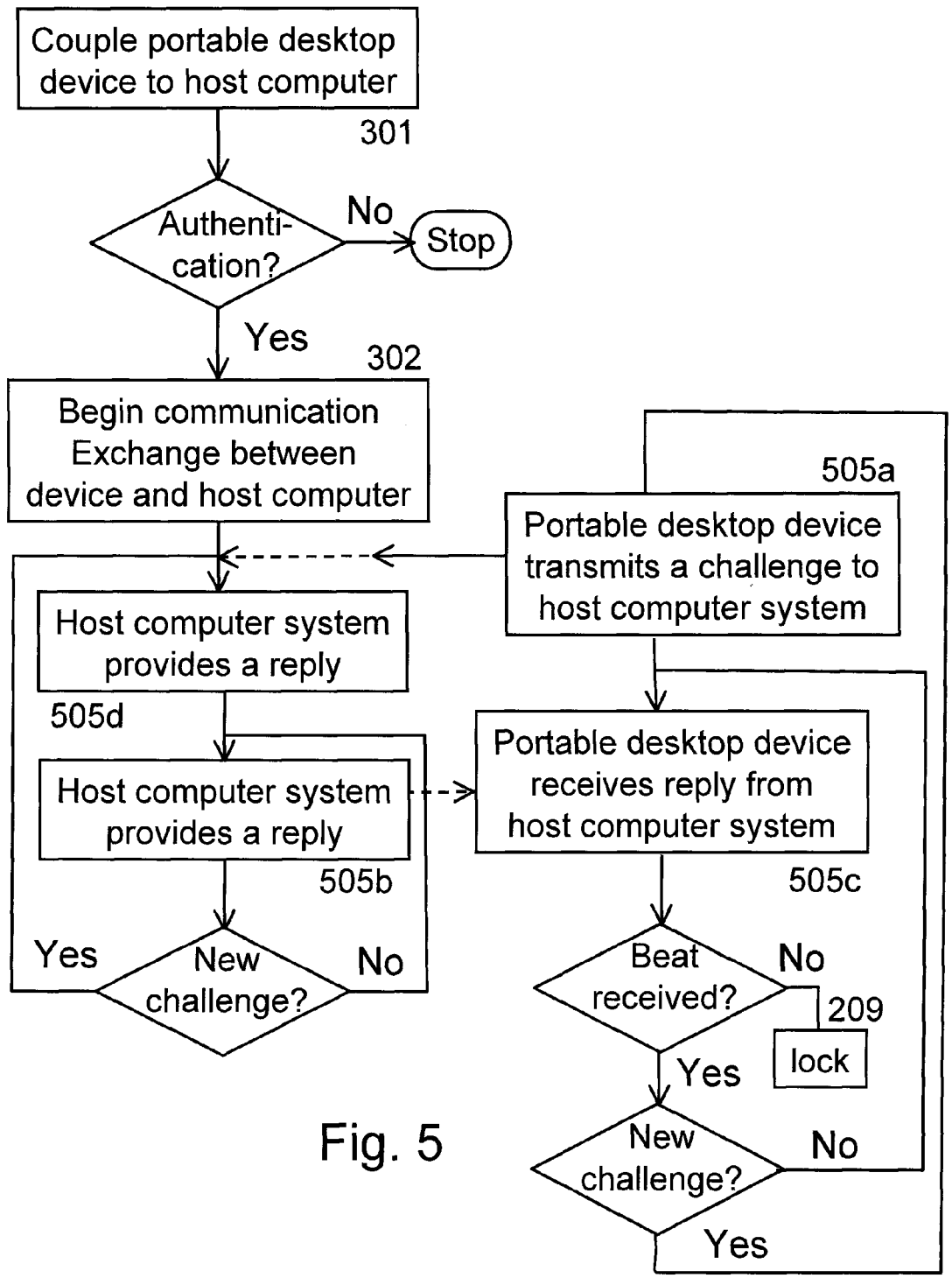
FIG. 5 is a simplified flow diagram of a method according to an embodiment of the invention.

Referring to FIG. 5, a simplified flow diagram of a method according to an embodiment of the invention is presented. Here, a portable desktop device 1000 is coupled to a host computer system 1900. The host initiates communication with the portable device which then authenticates the user thereto. Once a user has authenticated to the portable desktop device 1000, the device continues a communication exchange with the host computer system. In the communication exchange, the portable desktop device 1000 transmits a challenge at 505a to the host computer system 1900. The host computer system 1900 provides a reply comprising a sequence of replies provided at known intervals at 505d and 505b. The portable desktop device 1000 receives the plurality of replies provided from the host computer system 1900 at 505c. The plurality of replies are provided until a further challenge is received, which is followed by a second plurality of replies (to the further challenge). This challenge and reply process continues between the two devices—the portable desktop device 1000 and the host computer system 1900. If the communication path between devices is interrupted, the reply is not received and the portable desktop device "locks" itself at 209 as described hereinabove.

Figure 6:
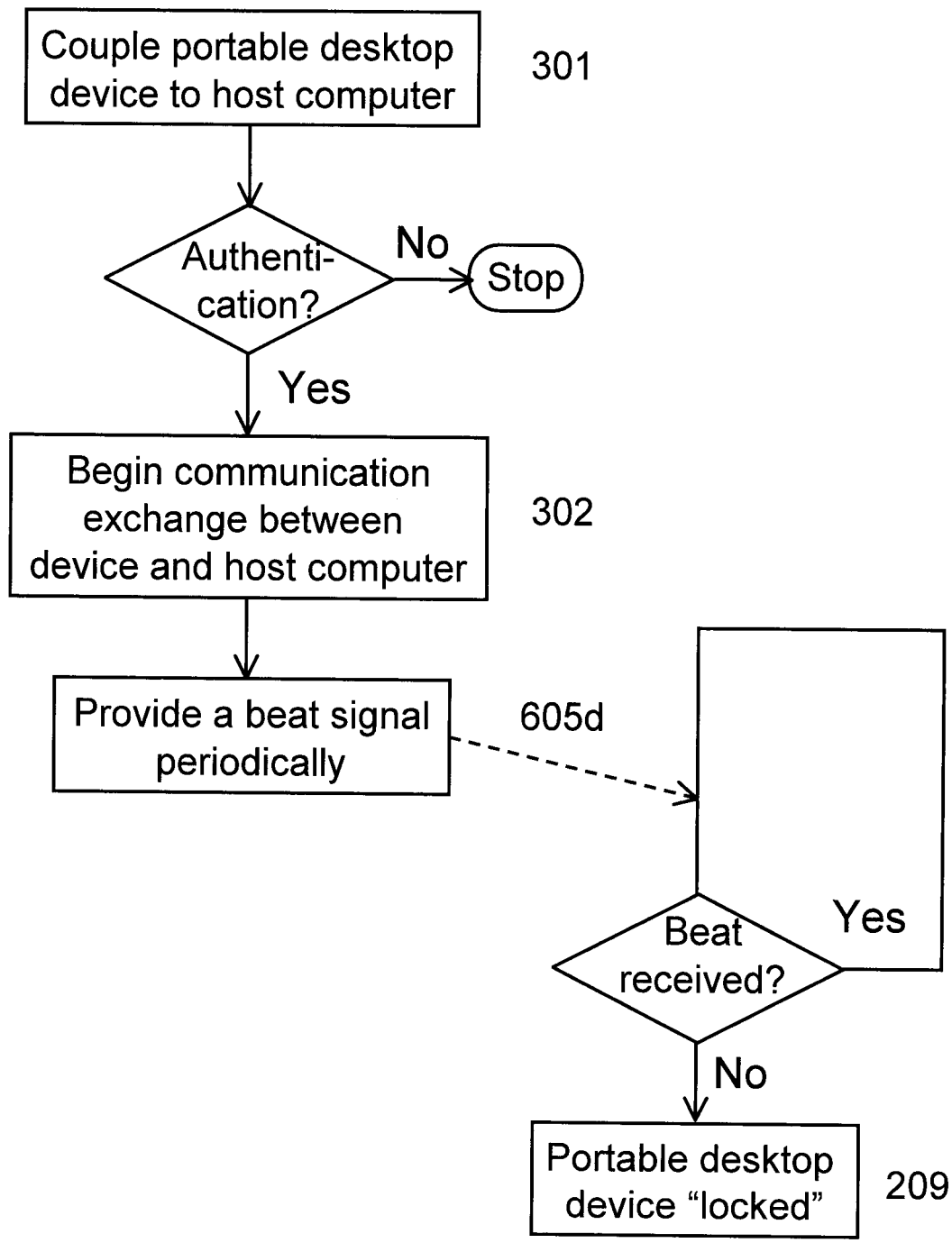
FIG. 6 is a simplified flow diagram of a method according to an embodiment of the invention.

Referring to FIG. 6, a simplified flow diagram of a method according to an embodiment of the invention is presented. Here, a portable desktop device 1000 is coupled to a host computer system 1900. Once a user has authenticated to the portable desktop device 1000, the device begins a communication exchange with the host computer system. In the communication exchange, the host computer system 1900 provides a beat signal periodically at 605b. Typically, the periods are fixed and are on the order of milliseconds. If the communication path between devices is interrupted, the beat signal is not received and the portable desktop device "locks" itself at 209 as described hereinabove.

The embodiments presented are exemplary only and persons skilled in the art would appreciate that variations to the embodiments described above may be made without departing from the spirit of the invention. The scope of the invention is solely defined by the appended claims.

What is claimed is:

1. A method comprising:
coupling a portable desktop device comprising portable desktop data stored therein to a host computer;
enabling access to the portable desktop data, wherein a user authentication operation is performed prior to supporting the portable desktop application;
executing on the host computer system a portable desktop application received from the portable desktop device;
at intervals known to the portable desktop device, transmitting from the host computer system to the portable desktop device a beat signal indicating a presence and operability of the host computer; and,
when the portable desktop device other than receives the beat signal at the known intervals, disabling access to the portable desktop data and preventing access thereto absent a further user authentication operation;
wherein a content of the beat signal transmitted from the host computer system to the portable desktop device varies in a fashion known to the portable desktop device; and
wherein the beat signal beats at intervals of between 1 and 30 milliseconds, such that timing of the beat signal is less than an amount of time required to disconnect and reconnect the portable desktop device.

2. A method according to claim 1, wherein the portable desktop device comprises circuitry for receiving an external power signal.

3. A method according to claim 1, wherein the portable desktop device comprises a battery for providing power thereto, and wherein removal of the portable desktop device from the host computer system while maintaining power to the device is detected as a potential security threat.

4. A method according to claim 1, wherein the beat signal comprises a digital value transmitted from the host computer system to the portable desktop device periodically at the known intervals.

5. A method according to claim 4, wherein the digital value is a same digital value transmitted at the known intervals repeatedly.

6. A method according to claim 1, wherein the beat signal comprises digital values following a known series.

7. A method according to claim 6, wherein the known series is determined from an initial seed value provided from the portable desktop device to the host computer system.

8. A method according to claim 7, wherein the beat signal comprises a plurality of known series of values each determined from an initial seed value provided from the portable desktop device to the host computer system, the initial seed values provided at second intervals.

9. A method according to claim 7, wherein the beat signal comprises a set of responses to challenges provided from the portable desktop device to the host computer system, the challenges provided at intervals.

10. A method according to claim 9, wherein the beat signal comprises a digital signature of data relating to the challenges provided.

11. A portable desktop device comprising:
I/O hardware for coupling the portable desktop device to a host computer system;
memory storage comprising:
a portable desktop storage block comprising a portable desktop O/S configured for executing a portable desktop application on the host computer system, wherein a user authentication operation is performed prior to supporting the portable desktop application on the host computer system; and
a processor for use with the portable desktop device in a powered state, the processor configured for:
receiving a beat signal from the host computer at intervals known to the portable desktop device; and in absence of receiving the beat signal at the known intervals, preventing access to the memory storage absent a further user authentication operation;

wherein a content of the beat signal transmitted from the host computer system to the portable desktop device varies in a fashion known to the portable desktop device; and wherein the beat signal beats at intervals of between 1 and 30 milliseconds, such that timing of the beat signal is less than an amount of time required to disconnect and reconnect the portable desktop device.

12. A portable desktop device according to claim 11, wherein the I/O hardware comprises a USB interface and the portable desktop device is inserted into a host computer USB port from which it derives power.

13. A portable desktop device according to claim 11, comprising a user authentication data transducer for receiving user authentication data from a user thereof.

14. A portable desktop device according to claim 13, comprising first data stored therein for use in user authentication wherein the processor is configured for:

receiving the user authentication data from the user authentication transducer;

comparing at least an aspect of the user authentication data with the first data; and, when the comparison is indicative of a match, unlocking at least one of the portable desktop O/S and data associated therewith and stored within the portable desktop device.

15. A portable desktop device comprising:

I/O hardware for coupling the portable desktop device to a host computer system;

memory storage comprising:

a portable desktop storage block comprising a portable desktop O/S for executing on the host computer system a portable desktop application, wherein a user authentication operation is performed prior to supporting the portable desktop application on the host computer system; and a processor for use while the portable desktop devise is in a powered state, the processor configured for:

providing to the host computer system at second intervals a challenge signal;

in response thereto receiving a beat signal from the host computer at first intervals; and in absence of receiving the beat signal at the first intervals, preventing access to the memory storage absent a further user authentication operation;

wherein a content of the beat signal transmitted from the host computer system to the portable desktop device varies in a fashion known to the portable desktop device; and wherein the beat signal beats at intervals of between 1 and 30 milliseconds, such that timing of the beat signal is less than an amount of time required to disconnect and reconnect the portable desktop device.

16. A portable desktop device according to claim 15, wherein the first intervals and the second intervals have approximately a same interval length.

17. A portable desktop device according to claim 15, wherein the second intervals are substantially longer than the first intervals.

18. A portable desktop device according to claim 15, comprising cipher circuitry and wherein the beat signal comprises a digital signature of data relating to the challenge signal.

\* \* \* \* \*